(12) United States Patent
Leclercq et al.

(10) Patent No.: US 9,429,658 B2
(45) Date of Patent: Aug. 30, 2016

(54) METHOD AND SYSTEM FOR A DUAL MODE GLOBAL NAVIGATION SATELLITE SYSTEM

(75) Inventors: Maxime Leclercq, Encinitas, CA (US); Ioannis Spyropoulos, La Jolla, CA (US); Nishant Kumar, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 605 days.

(21) Appl. No.: 13/462,358

(22) Filed: May 2, 2012

(65) Prior Publication Data

US 2013/0106652 A1    May 2, 2013

Related U.S. Application Data

(60) Provisional application No. 61/552,593, filed on Oct. 28, 2011, provisional application No. 61/552,679, filed on Oct. 28, 2011.

(51) Int. Cl.
*G01S 19/42* (2010.01)
*G01S 19/33* (2010.01)
*G01S 19/34* (2010.01)

(52) U.S. Cl.
CPC .............. *G01S 19/423* (2013.01); *G01S 19/33* (2013.01); *G01S 19/34* (2013.01); *G01S 19/42* (2013.01)

(58) Field of Classification Search
CPC .... G01S 19/46; G01S 19/423; G01S 19/425; G01S 19/48; G01S 19/10; G01S 19/31; G01S 19/33; G01S 19/34; G01S 19/23; G01S 19/235
USPC ............ 342/357.29, 357.31, 357.47, 357.71, 342/357.73, 357.74
See application file for complete search history.

(56) References Cited

U.S. PATENT DOCUMENTS

| | | | | |
|---|---|---|---|---|
| 5,812,961 | A * | 9/1998 | Enge | G01S 19/04 342/357.44 |
| 6,178,195 | B1 * | 1/2001 | Durboraw et al. | 375/136 |
| 6,373,432 | B1 * | 4/2002 | Rabinowitz | G01S 19/04 342/3 |
| 7,392,134 | B2 * | 6/2008 | Tauchi | G01C 21/26 340/988 |
| 8,134,502 | B2 * | 3/2012 | Lennen | 342/357.74 |
| 8,742,985 | B1 * | 6/2014 | Jia | 342/357.74 |
| 2006/0244656 | A1 * | 11/2006 | Lawrence et al. | 342/357.02 |
| 2007/0013583 | A1 * | 1/2007 | Wang et al. | 342/357.15 |
| 2010/0127925 | A1 * | 5/2010 | Conroy | G01S 19/33 342/357.63 |
| 2010/0265128 | A1 * | 10/2010 | Martens | G01S 19/38 342/357.25 |

* cited by examiner

*Primary Examiner* — Cassie Galt
(74) *Attorney, Agent, or Firm* — McAndrews Held & Malloy (57) ABSTRACT

Methods and systems for a dual mode global navigation satellite system may comprise selectively enabling a medium Earth orbit (MEO) radio frequency (RF) path and a low Earth orbit (LEO) RF path in a wireless communication device to receive RF satellite signals. The signals may be down-converted to determine a position of the wireless device. The signals may be down-converted utilizing local oscillator signals from a phase locked loop (PLL). The RF paths may be time-division duplexed by the selective enabling of the MEO and LEO paths. Acquisition and tracking modules in the MEO RF path may be blanked when the LEO RF path is enabled. The MEO RF path may be powered down when the LEO RF path is enabled. The signals may be down-converted to an intermediate frequency before down-converting to baseband frequencies or may be down-converted directly to baseband frequencies. In-phase and quadrature signals may be processed.

22 Claims, 7 Drawing Sheets

United States Patent US 9,429,658 B2

METHOD AND SYSTEM FOR A DUAL MODE GLOBAL NAVIGATION SATELLITE SYSTEM

CROSS-REFERENCE TO RELATED APPLICATIONS/INCORPORATION BY REFERENCE

This application makes reference to and claims priority to U.S. Provisional Application Ser. No. 61/552,593 filed on Oct. 28, 2011, and Provisional Application Ser. No. 61/552,679 filed on Oct. 28, 2011, each of which is hereby incorporated herein by reference in its entirety.

FIELD OF THE INVENTION

Certain embodiments of the invention relate to wireless communication. More specifically, certain embodiments of the invention relate to a method and system for repurposing of a global navigation satellite system receiver for receiving low-earth orbit communication satellite timing signals.

BACKGROUND OF THE INVENTION

Global navigation satellite systems (GNSS) such as the NAVSTAR global positioning system (GPS) or the Russian GLONASS provide accurate positioning information for a user anywhere on Earth that GNSS signals may be received. GNSS satellites are medium earth orbit satellites, about 12,000 miles above the surface. Highly accurate GNSS clock signals from these satellites may be used to accurately determine the position of a receiver.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a dual mode global navigation satellite system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a dual mode global navigation satellite system. Exemplary aspects of the invention may comprise selectively enabling a medium Earth orbit (MEO) radio frequency (RF) path and a low Earth orbit (LEO) RF path in a wireless communication device to receive RF satellite signals. The received RF satellite signals may be down-converted and a position of the wireless device may be determined utilizing the down-converted signals. The received RF signals may be down-converted utilizing one or more local oscillator signals generated by a phase locked loop (PLL). The RF paths may be time-division duplexed by the selective enabling of the MEO path and the LEO path. Acquisition and tracking modules in the MEO RF path may be blanked when the LEO RF path is enabled or LEO baseband modules in the LEO RF path 115, 210, 260 may be blanked when the MEO RF path 113, 220, 250 is enabled. The MEO RF path may be powered down when the LEO RF path is enabled. The received RF satellite signals may be down-converted to an intermediate frequency before down-converting to baseband frequencies. The received RF satellite signals may be down-converted directly to baseband frequencies. The received RF satellite signals may be processed utilizing one or more surface acoustic wave (SAW) filters. In-phase and quadrature signals may be processed in the MEO RF path and/or the LEO RF path. The wireless communication device may be controlled by a reduced instruction set computing (RISC) central processing unit (CPU).

Figure 1A:
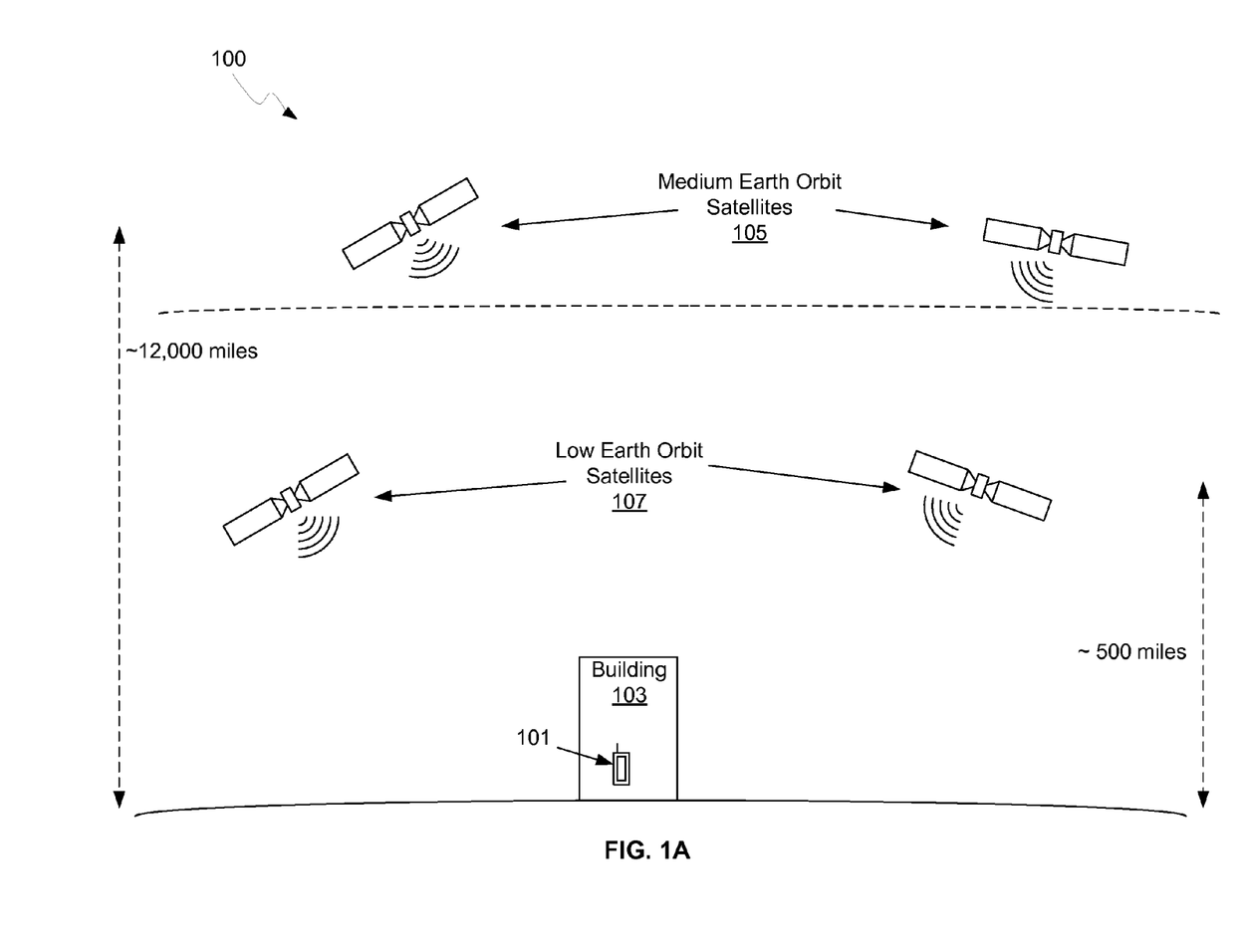
FIG. 1A is a diagram illustrating an exemplary wireless device with a dual mode global navigation satellite system, in accordance with an embodiment of the invention.

FIG. 1A is a diagram illustrating an exemplary wireless device with a dual mode global navigation satellite system, in accordance with an embodiment of the invention. Referring to FIG. 1A, there is shown a satellite navigation system 100 comprising a handheld communication device 101, a building 103, medium Earth orbit (MEO) satellites 105, and low Earth orbit (LEO) satellites 107. There is also shown the approximate height in miles of medium Earth and low Earth satellites of ~12,000 miles and ~500 miles, respectively.

The handheld communication device 101 may comprise any device or vehicle (e.g. smart phone) where its user may desire to know the location of such device or vehicle. The handheld communication device 101 may comprise a global navigation satellite system (GNSS) receiver having a configurable RF path that may be operable to receive medium Earth orbit (MEO) satellite signals and low Earth orbit (LEO) satellite signals.

The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as satellite phones, whereas the MEO satellites 105 may be utilized for location and navigation applications.

In certain circumstances, MEO signals, such as GPS signals, may be attenuated by buildings or other structures to such an extent that GPS receivers cannot acquire or track any GPS satellites. However, due to the stronger signal strength of LEO satellite signals, the LEO signals may be utilized by devices to supplement or substitute the MEO systems in the devices. However, the frequencies utilized for MEO and LEO satellite communication are obviously not the same, so a conventional GPS receiver cannot process LEO signals such as Iridium signals.

In an exemplary embodiment, the wireless device 101 may be operable to receive both LEO satellite signals, such as Iridium signals, and MEO signals, such as GPS signals concurrently or in a time division manner. In this manner, the receiver may be able to determine the user's location despite having high attenuation of GPS signals to below that of the sensitivity of the receiver. Thus, the handheld communication device 101 may be able to accurately determine its location by receiving either or both Iridium and GPS satellite signals. This may be enabled by utilizing separate RF paths, one path configured to receive MEO signals and the other path configured to receive LEO satellite signals.

In an exemplary scenario, the two separate RF paths may share some front-end components, such as an antenna, low-noise amplifier (LNA), and a splitter, for example. In this scenario, the shared front-end components may comprise enough bandwidth to process both MEO and LEO signals. In another exemplary scenario, the wireless device may utilize separate front-end components. Furthermore, in instances where only one type of signal is to be received, the inactive RF path may be powered down to conserve power.

In yet another exemplary scenario, the separate RF paths may be time-division duplexed (TDD), or selectively enabled, such that both MEO and LEO signals may be received, but at alternating times. This may enable MEO-assisted LEO positioning or LEO-assisted MEO positioning, for example. The wireless device 101 may comprise a blanking or switching module for enabling TDD signal reception, where the TDD process may be carried out in the digital domain. For example, the MEO, or GPS, processing path may be blanked, i.e. set to and held at the last sampled value or a known pattern, while the LEO path receives and demodulates LEO signals.

Figure 1B:
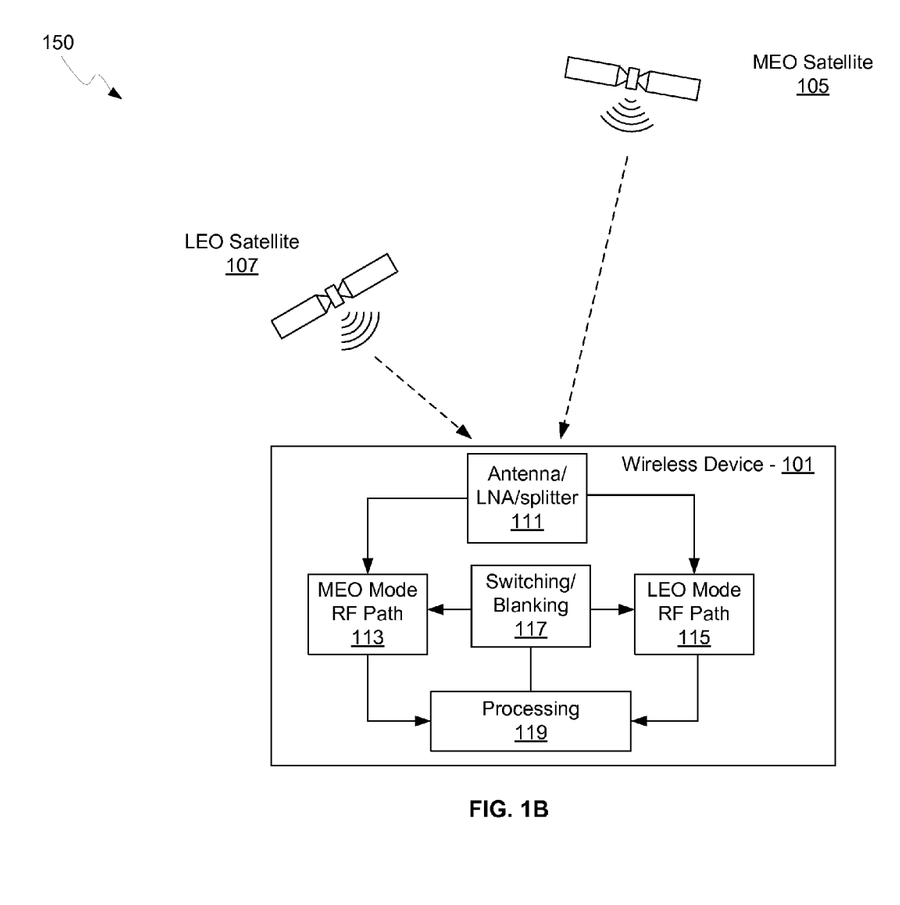
FIG. 1B is a block diagram of an exemplary dual mode global navigation satellite system, in accordance with an embodiment of the invention.

FIG. 1B is a block diagram of an exemplary dual mode global navigation satellite system in accordance with an embodiment of the invention. Referring to FIG. 1B, there is shown is shown MEO satellites 105 and LEO satellites 107 and the wireless device 101. The wireless device 101 may comprise common RF front end elements such as an antenna/low-noise amplifier (LNA)/signal splitter 111. The wireless device 101 may also comprise a MEO mode RF path 113, a LEO mode RF path 115, a switching/blanking module 117, and a processing block 119.

The MEO mode RF path 113 and LEO mode RF path 115 may comprise amplification, down-conversion, filtering, and analog-to-digital conversion capability, for example, for the corresponding received MEO and LEO signals. This is described further with respect to FIGS. 2A and 2B. The processing block 119 may comprise one or more CPUs (e.g. a RISC CPU) for demodulating signals and calculating positioning information, for example.

The switching/blanking module 117 may be operable to switch between the MEO mode path and LEO mode paths in the time domain. Received and down-converted RF signals may then be communicated to the processing block 119. The switching may be based on LEO satellite signal burst schedule, for example. During the LEO receiving time period, the MEO mode RF path may be blanked, i.e., held at the most recent received data point, to avoid losing MEO signal tracking.

In an exemplary scenario, the wireless device 101 may be operable to receive both LEO and MEO satellite signals via the separate RF paths, the MEO Mode RF path 113 and the LEO RF path 115. By alternating between the two paths, positioning accuracy may be increased by augmenting one type of signal with the other. For example, if MEO signals are not at optimum signal strength, LEO signals may be utilized to determine the initial position or calibrate the internal clock of the wireless device 101, thus assisting the MEO positioning system.

In another exemplary scenario, the switching/blanking module 117 may be operable to power down the MEO mode RF path 113 or the LEO mode RF path 115 when the other path is receiving signals.

Figure 2A:
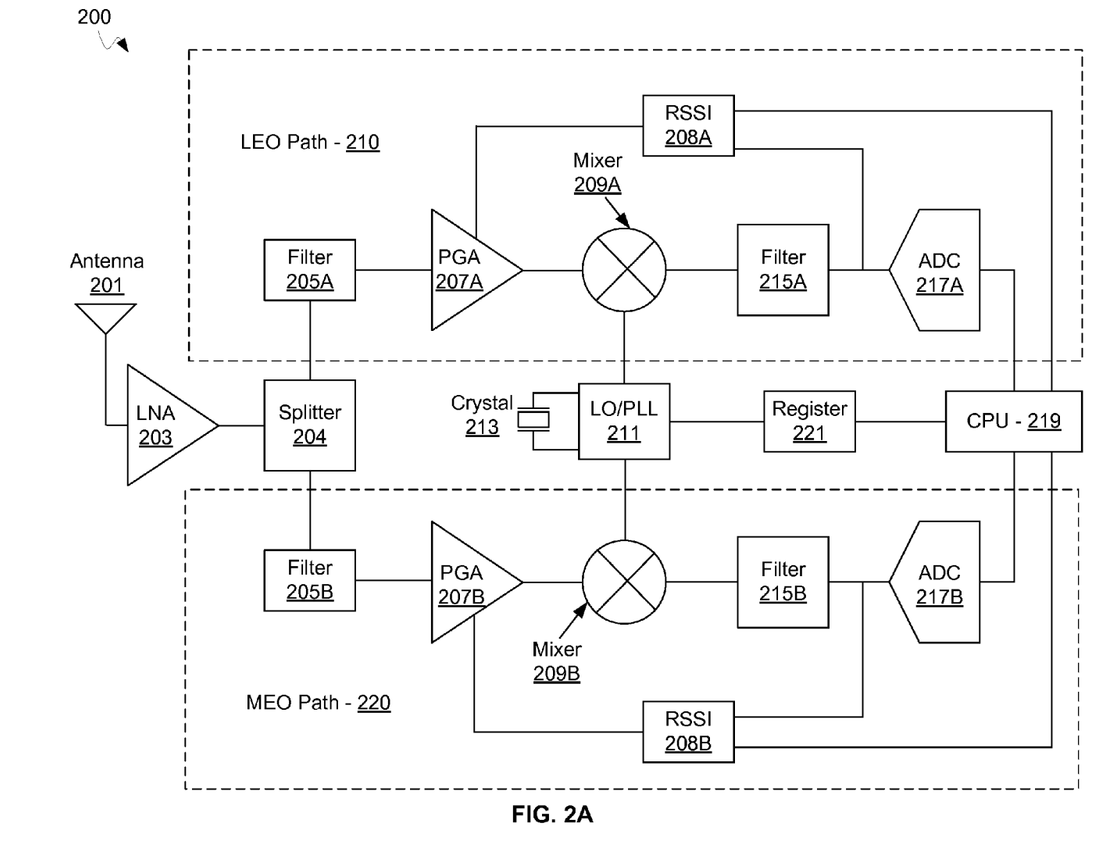
FIG. 2A is a diagram illustrating an exemplary dual mode radio frequency receiver, in accordance with an embodiment of the invention.

FIG. 2A is a diagram illustrating an exemplary dual mode radio frequency receiver, in accordance with an embodiment of the invention. Referring to FIG. 2A, there is shown a receiver 200 comprising an antenna 201, a low noise amplifier (LNA) 203, a signal splitter 204, a LEO path 210, a MEO path 220, a local oscillator (LO)/phase locked loop (PLL) 211, a crystal oscillator 213, a central processing unit 219, and a register 221.

The LEO path 210 and MEO path 220 may comprise similar components, configured for different frequencies as needed, such as a programmable gain amplifiers (PGAs) 207A and 207B, receive signal strength indicator modules (RSSI) 208A and 208B, mixers 209A and 209B, filters 215A and 215B, and analog-to-digital converters (ADCs) 217A and 217B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the splitter 204. The LNA 203 may have a wide enough bandwidth to amplify both MEO and LEO satellite signals.

The signal splitter 204 may be operable to communicate part of the signal received from the antenna 201 to the LEO path 210 and part to the MEO path 220. This may be achieved by splitting the signal at a certain percentage to each path, such as 50%/50%, for example, or may split the received RF signal based on frequency, such that only MEO signals are communicated to the MEO path 220 and only LEO signals are communicated to the LEO path 210.

The filters 205A and 205B may comprise active or passive filters and may be operable to attenuate signals at frequencies outside a desired range and allow desired signals to path. For example, the filter 205A may pass LEO satellite signals while filtering out MEO signals.

The PGAs 207A and 207B may provide amplification to signals received from the filters 205A and 205B, and may be configured to operate at MEO or LEO frequencies, or may operate over both frequency ranges, for example. The PGA 207 may be configured by a processor, such as the CPU 219.

The filter modules 205A and 205B may comprise active and/or passive filters for removing unwanted signals while allowing desired signals to pass to the PGAs 207A and 207B. In an exemplary scenario, the filter modules 205A and 205B comprises surface acoustic wave (SAW) filters.

The RSSI modules 208A and 208B may comprise circuitry for determining the magnitude of a received signal, and may sense signal strengths at the PGAs 207A or 207B or for down-converted signals after the filters 215A and 215B, for example. Accordingly, the RSSI modules 208A and 208B may be operable to sense signal strength at any point along the RF paths in the receiver 200.

The mixers 209A and 209B may comprise circuitry that is operable to generate output signals at frequencies that are the sum and the difference between the input RF signals and the local oscillator signal received from the LO/PLL 211. In an exemplary scenario, the LEO path 210 and the MEO path 220 may comprise two paths each to enable the reception of in-phase and quadrature (I and Q) signals. Accordingly, the mixers 209A and 209B may each comprise two mixers, each receiving LO signals with 90 degree phase difference to the other mixer of the pair.

In another exemplary scenario, the mixer 209 may down-convert the received RF signals to an intermediate frequency (IF) for further processing, as opposed to down-converting directly to baseband. In this scenario, the filter modules 215A and 215B may comprise a bandpass filter that is configured to pass the desired IF signals while filtering out the undesired low and high frequency signals.

The LO/PLL 211 may comprise circuitry that is operable to generate RF signals to enable down-conversion of RF signals received by the mixers 209A and 209B. The LO/PLL 211 may comprise a voltage-controlled oscillator, for example, with a PLL to stabilize the frequency of the output signal communicated to the mixers 209A and 209B. In an exemplary scenario, the LO/PLL 211 may generate a plurality of LO signals for down-converting I and Q signals in the LEO path 210 and the MEO path 220.

The crystal oscillator 213 may comprise a stable clock source for the receiver 200, and may comprise a piezoelectric crystal, for example, that outputs a stable clock signal at a given temperature. The crystal oscillator 213 may comprise a source for the various LO signals to be communicated to the mixers via the LO/PLL 211.

The ADCs 217A and 217B may comprise circuitry that is operable to convert analog input signals to digital output signals. Accordingly, the ADCs 217A and 217B may receive baseband or IF analog signals from the mixers 209A and 209B and may generate digital signals to be communicated to the CPU 219.

The CPU 219 may comprise a processor similar to the processor 113, for example, described with respect to FIG. 1B. Accordingly, the CPU 219 may be operable to control the functions of the receiver 200 and may process received baseband or IF signals to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data.

The CPU 219 may receive RSSI information from the RSSI modules 208A and 208B and may control the gain of the various gain stages in the Rx paths. Similarly, the CPU may control the LO/PLL 211 via the register 221.

The register 221 may comprise a memory register for storing a configuration to be communicated to the LO/PLL to down-convert MEO and/or LEO signals. The register 221 may communicate an output signal to the LO/PLL 211 that indicates the desired frequency signals to down-convert to received RF signals to IF or baseband.

Figure 2B:
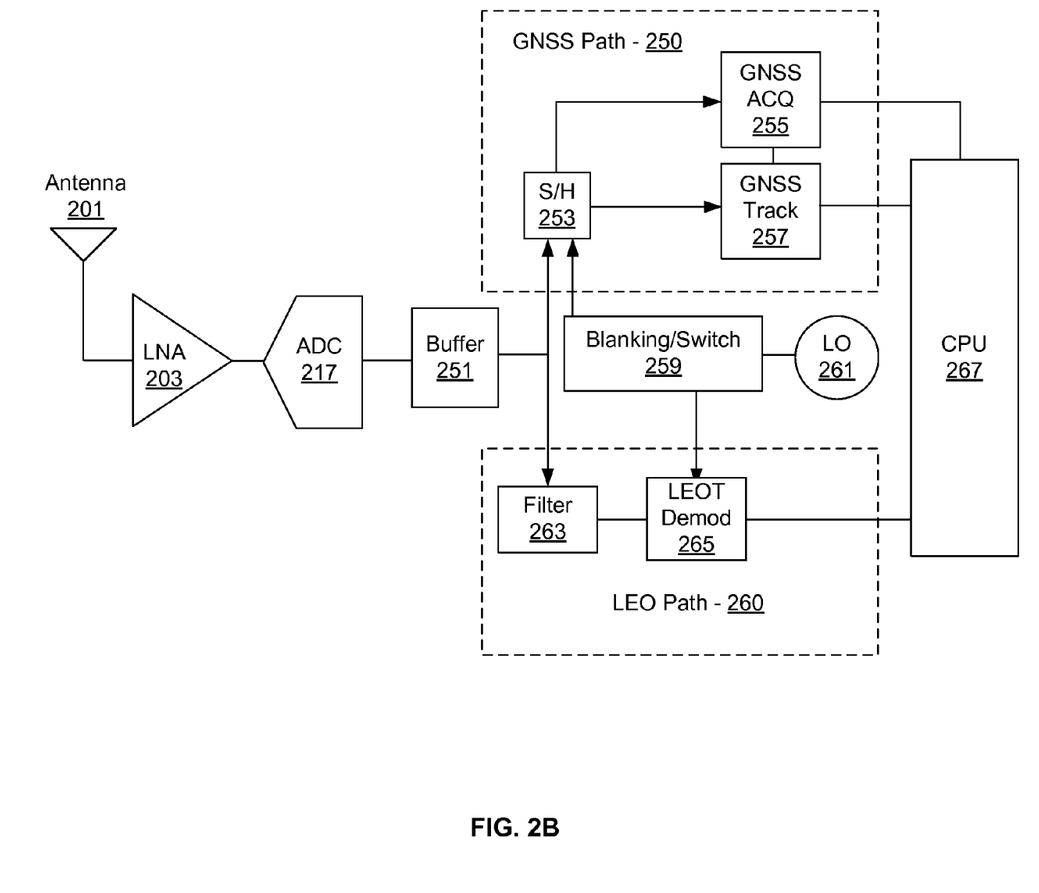
FIG. 2B is a block diagram illustrating a dual-mode time-division duplex satellite receiver, in accordance with an embodiment of the invention.

FIG. 2B is a block diagram illustrating a dual-mode time-division duplex satellite receiver, in accordance with an embodiment of the invention. Referring to FIG. 2B, there is shown an exemplary receiver 250 comprising an antenna 201, a low-noise amplifier (LNA) 203, an analog-to-digital converter (A/D) 217, a buffer 251, and two paths, a MEO path 250, and a LEO path 260. There is also shown a blanking/switch module 259, a LO/PLL 261 and a central processing unit (CPU) 267.

The MEO path 250 may comprise a sample and hold (S/H) module 253, a GNSS acquisition module 255, and a GNSS tracking module 257. The S/H module 253 may be operable to sample the digital signal from the buffer 251, and hold the sampled value for a configurable time, which may be communicated to the GNSS acquisition module 255 and the GNSS tracking module 257. The S/H module 253 may thus act as a gatekeeper for data to the GNSS acquisition module 255 and the GNSS tracking module 257. This may enable the receiver 250 to switch between MEO and LEO signals without losing a MEO value when receiving LEO signals, for example, and avoid the divergence of the output of the GNSS acquisition module 255 and the GNSS tracking module 257. In another exemplary scenario, the S/H module 253 may output a constant value, a string of zeroes, for example, or any known patter to avoid divergence of the output of the GNSS acquisition module 255 and the GNSS tracking module 257.

The GNSS acquisition module 255 may be operable to acquire a lock to one or more GNSS satellites, which may allow the GNSS tracking module 257 to determine and track the location of the receiver. The GNSS acquisition module 255 may detect LEO frequency signals above a threshold signal strength and extract an accurate clock by determining the code-division multiple access (CDMA) collision avoidance (CA) code for the received data. A determined satellite ID and CA code may be used by the GNSS tracking module 257 for accurate positioning purposes.

Similarly, the LEO path 260 may comprise a filter 263 and a LEO timing signal demodulator module 265. The LEO timing signal demodulator module 265 may receive filtered MEO signals from the filter 263 and may demodulate the received signal to an accurate clock from the transmitting satellite. This accurate clock along with information regarding the satellite orbit may be utilized for positioning. In this manner either MEO or LEO signals, or both, may be utilized for positioning purposes.

The LEO timing demodulator 265, the GNSS acquisition module 255, and the GNSS tracking module 257 may communicate output signals to the CPU for further processing or use of the determined timing and/or positioning data.

The blanking/switching module 259 may be operable to provide the TDD function for the receiver, switching on and off or blanking the LEO path 260 and blanking the MEO path 250 by configuring the output of the S/H module 253 to retain the previous data to the GNSS acquisition module. The LO/PLL 261 may provide a timing signal for the blanking/switch module.

The filter 263 be operable to filter out unwanted signals allowing the desired satellite RF signal to pass to the LEOT demodulator module 265. The LEO timing demodulator may be operable to extract an accurate timing signal from the received LEO signals, which along with satellite ephemeris data, may be utilized by the CPU 267 for positioning purposes.

Figure 3:
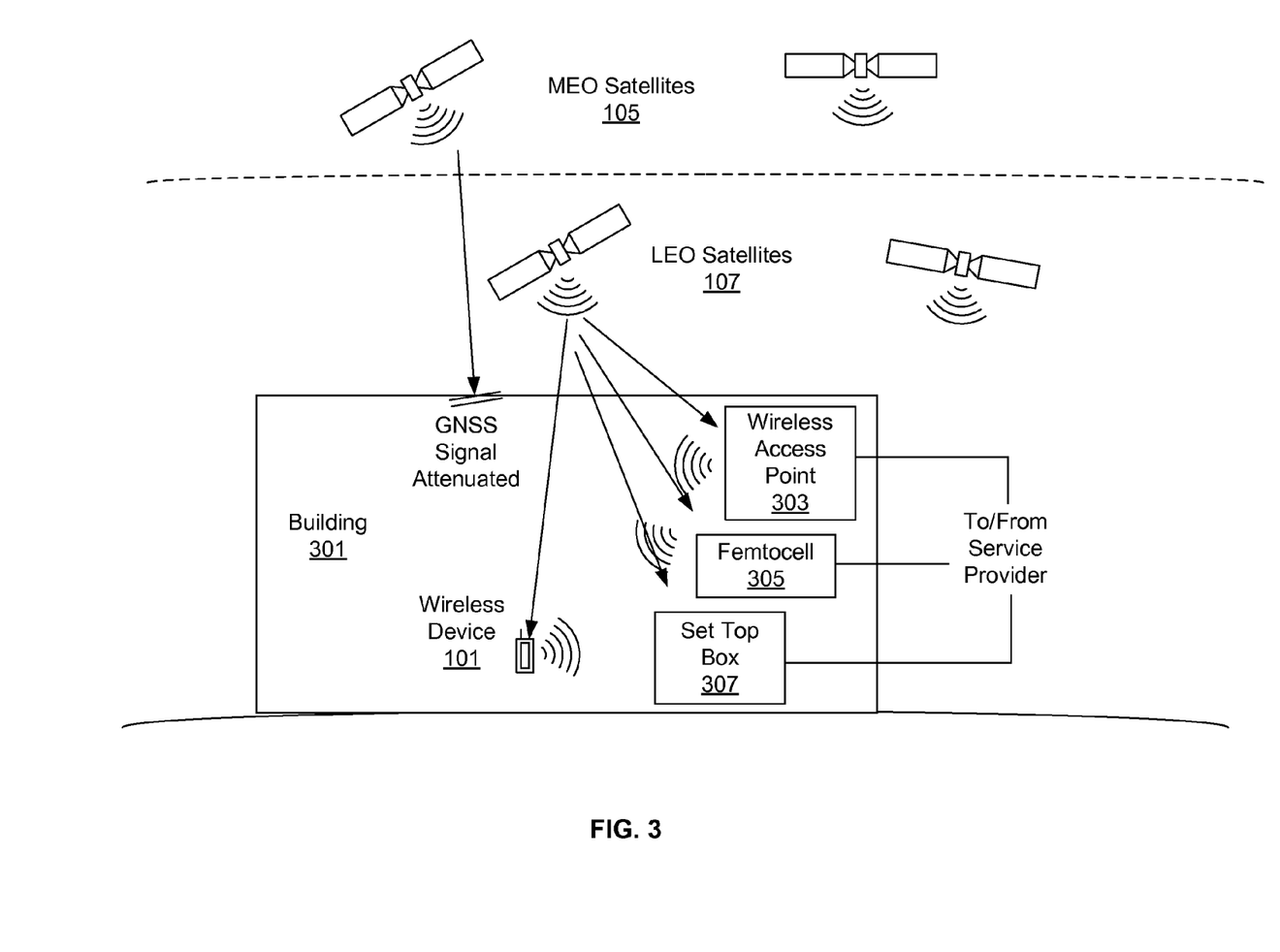
FIG. 3 is a schematic illustrating an exemplary application for a dual-mode satellite receiver, in accordance with an embodiment of the invention.

FIG. 3 is a schematic illustrating an exemplary application for a dual-mode satellite receiver, in accordance with an embodiment of the invention. Referring to FIG. 3, there are shown MEO satellites 105, LEO satellites 107, and a building 301 comprising exemplary devices such as the wireless device 101, a set-top box 307, a femtocell router 305, and a wireless access point 303. The wireless device 101, set-top box 307, femtocell router 305, and wireless access point 303 may comprise dual-mode MEO/LEO receivers such that they may receive LEO satellite signals even when MEO signals are attenuated.

In an exemplary scenario, the devices within the building 301 may not be able to lock onto MEO GNSS (e.g. GPS) signals due to attenuation of the building 301. Accordingly, the wireless device 101, set-top box 307, femtocell router 305, and wireless access point 303 may receive LEO signals, filter, down-convert, filter, convert to digital, and demodulate the signals to extract a UTC time and frequency signal. This clock extraction may enable time assist and injection for the GNSS search engine when the HNSS signal is not strong enough, generating a one pulse per second signal (1PPS).

Furthermore, these timing signals may allow the devices to accurately determine their positions by comparing signals from a plurality of satellites. For example, service providers may need to know the location of access points or femtocells that it supports, which may be more difficult if the devices are portable. By integrating a dual-mode GNSS/LEO receiver, the devices may accurately determine their location even from within attenuating structures, consistently or on a periodic basis, for example, and communicate this information to an appropriate service provider. This location information may be aggregated for a plurality of devices in a database that may be accessible to other users.

Figure 4:
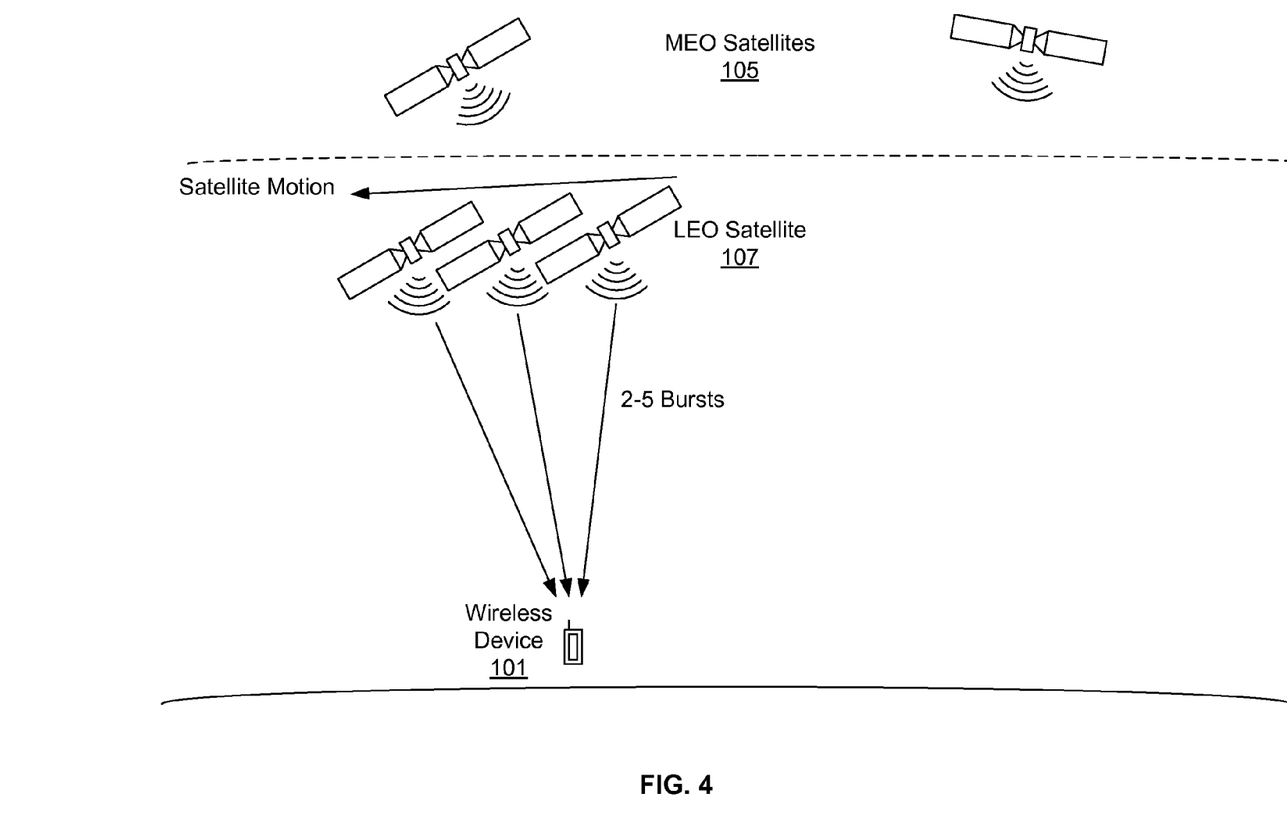
FIG. 4 is a schematic illustrating a LEO-assisted GNSS receiver hot start, in accordance with an embodiment of the invention.

FIG. 4 is a schematic illustrating a LEO-assisted GNSS receiver hot start, in accordance with an embodiment of the invention. Referring to FIG. 4, there is shown MEO satellite 105 and a LEO satellite 107 moving in the direction indicated over two time intervals. In an exemplary scenario, 2-5 bursts from the LEO satellite 107 may be received by the wireless device 101 over a few seconds. The bursts may be down-converted and de-modulated to extract an accurate clock that may calibrate the LO/PLL and/or TCXO of MEO receiver circuitry and therefore reduce the GNSS (e.g. GPS) acquisition time. Furthermore, this may enable a coarse location determination from the LEO signals and with static ephemeris data stored in the device, a GPS hot start may therefore be enabled. This may also enable lower power operation, as the GPS receiver path may be switched off or configured in a lower power mode, and quickly restarted utilizing LEO timing signals and clock source calibration.

Figure 5:
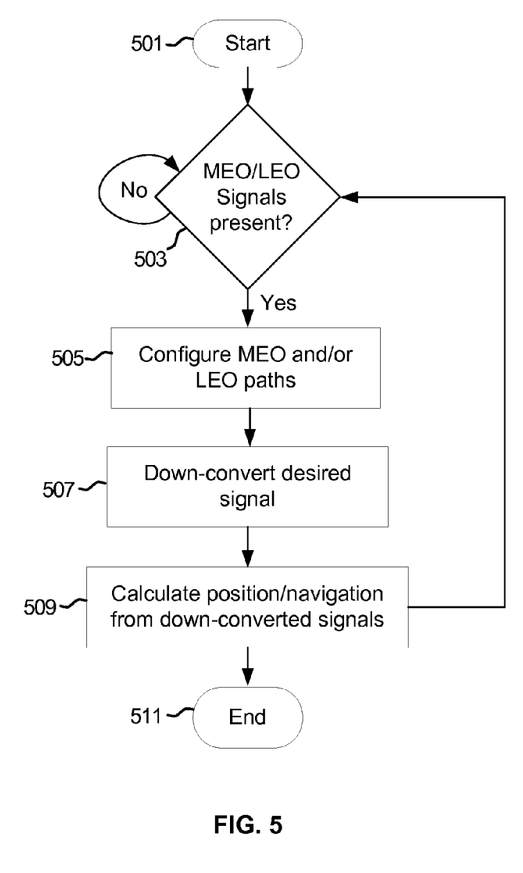
FIG. 5 is a block diagram illustrating exemplary steps for a dual-mode global navigation satellite system receiver, in accordance with an embodiment of the invention.

FIG. 5 is a block diagram illustrating exemplary steps for a dual-mode global navigation satellite system receiver, in accordance with an embodiment of the invention. The exemplary method illustrated in FIG. 5 may, for example, share any or all functional aspects discussed previously with regard to FIGS. 1A-4.

Referring to FIG. 5, after start step 501, in step 503, the wireless device may determine whether LEO and/or MEO signals are present. If yes, the exemplary steps may proceed to step 505 where the MEO and/or LEO path may be configured to receive, filter, and amplify the desired signal type. In step 507, the received, filtered, and amplified signal may be down-converted to IF to subsequently be converted to baseband frequencies, or may be down-converted directly to baseband frequencies. The local oscillator signal for the down-conversion may be generated via a single LO/PLL or a plurality of LO/PLLs. A switching/blanking mechanism may activate and/or deactivate an RF path when the other RF path is in use. In addition, GNSS circuitry may be blanked, or configured at a specific known value, while the LEO path is in use.

In step 509, the received and down-converted signals may be demodulated and decoded to extract accurate timing information for calculating the position of the wireless device. This is followed by end step 511.

In an embodiment of the invention, a method and system may comprise selectively enabling a medium Earth orbit (MEO) radio frequency (RF) path 113, 220, 250 and a low Earth orbit (LEO) RF path 115, 210, 260 in a wireless communication device 101 to receive RF satellite signals. The received RF satellite signals may be down-converted and a position of the wireless device 101 may be determined utilizing the down-converted signals.

The received RF signals may be down-converted utilizing one or more local oscillator signals generated by a phase locked loop (PLL) 211, 261. The MEO RF path 113, 220, 250 and LEO RF path 115, 210, 260 may be time-division duplexed by the selective enabling of the MEO path and the LEO path. Acquisition and/or tracking modules in the MEO RF path 113, 220, 250 may be blanked when the LEO RF path 115, 210, 260 is enabled or LEO baseband modules in the LEO RF path 115, 210, 260 may be blanked when the MEO RF path 113, 220, 250 is enabled. The MEO RF path 113, 220, 250 may be powered down when the LEO RF path 115, 210, 260 is enabled.

The received RF satellite signals may be down-converted to an intermediate frequency before down-converting to baseband frequencies. The received RF satellite signals may be down-converted directly to baseband frequencies. The received RF satellite signals may be processed utilizing one or more surface acoustic wave (SAW) filters 205A, 205B. In-phase and quadrature signals may be processed in the MEO RF path 113, 220, 250 and/or the LEO RF path 115, 210, 260. The wireless communication device 101 may be controlled by a reduced instruction set computing (RISC) central processing unit (CPU) 119, 219, 267.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a dual-mode global navigation satellite system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless communication device comprising a medium Earth orbit (MEO) radio frequency (RF) path and a low Earth orbit (LEO) RF path:
      selectively enabling in a time-division duplexed manner said MEO RF path to receive MEO RF satellite signals and said LEO RF path to receive LEO RF satellite signals;
      blanking the MEO RF path when the LEO RF path is receiving said LEO RF satellite signals and blanking the LEO RF path when the MEO RF path is receiving said MEO RF satellite signals;
      down-converting said received MEO RF satellite signals in said MEO RF path;
      down-converting said received LEO RF satellite signals in said LEO RF path;
      calculating a first position of said wireless device utilizing only said down-converted MEO RF satellite signals; and
      calculating a second position of said wireless device utilizing only said down-converted LEO RF satellite signals.

2. The method according to claim 1, comprising down-converting said received RF signals utilizing one or more local oscillator signals generated by a phase locked loop (PLL).

3. The method according to claim 1, comprising blanking an acquisition module in said MEO RF path when said LEO RF path is receiving said LEO RF satellite signals.

4. The method according to claim 1, comprising blanking a tracking module in said MEO RF path when said LEO RF path is receiving said LEO RF satellite signals.

5. The method according to claim 1, comprising blanking LEO baseband modules in said LEO RF path when said MEO RF path is receiving said MEO RF satellite signals.

6. The method according to claim 1, comprising powering down said MEO RF path when said LEO RF path is receiving said LEO RF satellite signals.

7. The method according to claim 1, comprising down-converting said received RF satellite signals to an intermediate frequency before down-converting to baseband frequencies.

8. The method according to claim 1, comprising down-converting said received RF satellite signals directly to baseband frequencies.

9. The method according to claim 1, comprising processing said received RF satellite signals utilizing one or more surface acoustic wave (SAW) filters.

10. The method according to claim 1, comprising processing in-phase and quadrature signals in said MEO RF path and said LEO RF path.

11. The method according to claim 1, wherein said wireless communication device is controlled by a reduced instruction set computing (RISC) central processing unit (CPU).

12. A system for wireless communication, the system comprising:
    circuitry in a wireless communication device, said circuitry comprising a medium Earth orbit (MEO) radio frequency (RF) path and a low Earth orbit (LEO) RF path, wherein said circuitry is operable to:
       selectively enable in a time-division duplexed manner said MEO RF path to receive MEO RF satellite signals and said LEO RF path to receive LEO RF satellite signals;
       blank the MEO RF path when the LEO RF path is receiving said LEO RF satellite signals and blank the LEO RF path when the MEO RF path is receiving said MEO RF satellite signals;
       down-convert said received MEO RF satellite signals in said MEO RF path;
       down-convert said received LEO RF satellite signals in said LEO RF path;
       calculate a first position of said wireless device utilizing only said down-converted MEO RF satellite signals; and
       calculate a second position of said wireless device utilizing only said down-converted LEO RF satellite signals.

13. The system according to claim 12, wherein said circuitry is operable to down-convert said received RF signals utilizing one or more local oscillator signals generated by a phase locked loop (PLL).

14. The system according to claim 12, wherein said circuitry is operable to blank an acquisition module in said MEO RF path when said LEO RF path is receiving said LEO RF satellite signals.

15. The system according to claim 12, wherein said circuitry is operable to blank a tracking module in said MEO RF path when said LEO RF path is receiving said LEO RF satellite signals.

16. The system according to claim 12, wherein said circuitry is operable to blank LEO baseband modules in said LEO RF path when said MEO RF path is receiving said MEO RF satellite signals.

17. The system according to claim 12, wherein said circuitry is operable to power down said MEO RF path when said LEO RF path is receiving said LEO RF satellite signals.

18. The system according to claim 12, wherein said circuitry is operable to down-convert said received RF satellite signals to an intermediate frequency before down-converting to baseband frequencies.

19. The system according to claim 12, wherein said circuitry is operable to down-convert said received RF satellite signals directly to baseband frequencies.

20. The system according to claim 12, wherein said circuitry is operable to process said received RF satellite signals utilizing one or more surface acoustic wave (SAW) filters.

21. The system according to claim 12, wherein said circuitry is operable to process in-phase and quadrature signals in said MEO RF path or said LEO RF path.

22. A system for wireless communication, the system comprising:
  circuitry in a wireless communication device, said circuitry comprising a medium Earth orbit (MEO) radio frequency (RF) path and a low Earth orbit (LEO) RF path, wherein said circuitry is operable to:
   selectively enable in a time-division duplexed manner said MEO RF path to receive MEO RF satellite signals and said LEO RF path to receive LEO RF satellite signals in a time-division duplex (TDD) mode;
   blank the MEO RF path when the LEO RF path is receiving said LEO RF satellite signals and blank the LEO RF path when the MEO RF path is receiving said MEO RF satellite signals;
   down-convert said received MEO RF satellite signals in said MEO RF path;
   down-convert said received LEO RF satellite signals in said LEO RF path
   calculate a first position of said wireless device utilizing only said down-converted MEO RF satellite signals; and
   calculate a second position of said wireless communication device utilizing only said down-converted LEO RF satellite signals.

* * * * *